(12) United States Patent
Matsumoto et al.

(10) Patent No.: US 12,394,214 B2
(45) Date of Patent: Aug. 19, 2025

(54) IMAGE PROCESSING APPARATUS (71) Applicant: DENSO TEN Limited, Kobe (JP)

(72) Inventors: Yuki Matsumoto, Kobe (JP); Naoshi Kakita, Kobe (JP); Takashi Kono, Kobe (JP); Yasutaka Nishijima, Kobe (JP); Shota Kinoshita, Kobe (JP)

(73) Assignee: DENSO TEN Limited, Kobe (JP)

( * ) Notice: Subject to any disclaimer, the term of this patent is extended or adjusted under 35 U.S.C. 154(b) by 211 days.

(21) Appl. No.: 18/369,434

(22) Filed: Sep. 18, 2023

(65) Prior Publication Data

US 2024/0312222 A1  Sep. 19, 2024

(30) Foreign Application Priority Data

Mar. 15, 2023 (JP) .................. 2023-040918
Aug. 28, 2023 (JP) .................. 2023-138349

(51) Int. Cl.
| G06V 20/58 | (2022.01) |
| G06T 5/20 | (2006.01) |
| G06T 7/20 | (2017.01) |
| G06T 7/90 | (2017.01) |
| G06V 10/25 | (2022.01) |
| G06V 10/60 | (2022.01) |

(52) U.S. Cl.
CPC .............. *G06V 20/584* (2022.01); *G06T 5/20* (2013.01); *G06T 7/20* (2013.01); *G06T 7/90* (2017.01); *G06V 10/25* (2022.01); *G06V 10/60* (2022.01); G06T 2207/10024 (2013.01)

(58) Field of Classification Search
None
See application file for complete search history.

(56) References Cited

U.S. PATENT DOCUMENTS

2020/0106942 A1*  4/2020  Jiang ................... H04N 23/743
2022/0076037 A1*  3/2022  Hochman ............. G05D 1/249

FOREIGN PATENT DOCUMENTS

JP  2018-063680 A  4/2018

* cited by examiner

*Primary Examiner* — Xiaolan Xu
(74) *Attorney, Agent, or Firm* — Oliff PLC (57) ABSTRACT

An image processing apparatus that identifies a lighting state of a traffic light having a green light, a yellow light, and a red light. The image processing apparatus includes a controller configured to: (i) specify a traffic light region in an image acquired from an in-vehicle camera; (ii) detect green pixels, yellow pixels, and red pixels in the traffic light region; (iii) perform weighting by assigning a higher weighting value to the green pixels, the yellow pixels and the red pixels in positions respectively corresponding to locations of the green light, the yellow light, and the red light in the traffic light region; and (iv) determine the lighting state of the traffic light as either green, yellow or red based on a comparison of a total number of pixels for each of the green, yellow and red pixels after performing the weighting.

18 Claims, 11 Drawing Sheets

IMAGE PROCESSING APPARATUS

BACKGROUND OF THE INVENTION

Field of the Invention

The invention relates to an image processing apparatus, an image processing method and a non-transitory computer-readable recording medium.

Description of the Background Art

Conventionally, a technology to identify a light color of a traffic light by analyzing a camera image acquired from a vehicle has been known. For example, the Japanese Published Unexamined Patent Application No. 2018-063680 discloses that a prior probability distribution indicating a presence probability of the traffic light in each position within a region of interest including the traffic light is calculated from the camera image, a contrast of pixels in the region of interest is updated according to the prior probability distribution, and a color of a lightning region specified by feature points of the image is identified as a display color of the traffic light.

However, in the above conventional technology, the rectangular region of interest includes a peripheral background in addition to the traffic light. Thus, when using the above conventional technology, the light color of the traffic light may be erroneously identified by the pixels of the colors other than the light color of the traffic light that is actually turned on.

Specifically, when a green light or a red light of the traffic light is turned on, for example, in a case where there is a yellow leafy tree in the background of the traffic light and leaves of the tree are reflected in the background of the traffic light in the camera image, more yellow pixels than green and red pixels are extracted from the region of interest in the camera image so that it may be erroneously determined that a yellow light is turned on.

SUMMARY OF THE INVENTION

According to one aspect of the invention, an image processing apparatus that identifies a lighting state of a traffic light having a green light, a yellow light, and a red light. The image processing apparatus includes a controller configured to: (i) specify a traffic light region in an image acquired from an in-vehicle camera; (ii) detect green pixels, yellow pixels, and red pixels in the traffic light region; (iii) perform weighting by assigning a higher weighting value to the green pixels, the yellow pixels and the red pixels in positions respectively corresponding to locations of the green light, the yellow light, and the red light in the traffic light region; and (iv) determine the lighting state of the traffic light as either green, yellow or red based on a comparison of a total number of pixels for each of the green, yellow and red pixels after performing the weighting.

It is an object of the invention to provide an image processing apparatus, an image processing method and a non-transitory computer-readable recording medium capable of improving a discrimination accuracy of light colors of a traffic light.

These and other objects, features, aspects and advantages of the invention will become more apparent from the following detailed description of the invention when taken in conjunction with the accompanying drawings.

DESCRIPTION OF THE EMBODIMENTS

An embodiment of an image processing apparatus, an image processing method, and a non-transitory computer-readable recording medium disclosed in the present application will be described in detail below with reference to the accompanying drawings. This invention is not limited to the embodiment described below.

In the following, it is assumed that an image processing apparatus 10 according to the embodiment is an in-vehicle apparatus to be mounted in a vehicle. The image processing apparatus 10 is provided to detect an object in an image consisting of a plurality of pixels and a state of the object by image recognition of a camera image. In this embodiment, it is assumed that the object to be detected is a traffic light 300. Furthermore, it is assumed that the state of the object to be detected is a lighting state of the traffic light 300. The lighting state refers to any one of a green lighting state, a yellow lighting state, and a red lighting state of the traffic light 300. The lighting state may include a state in which an arrow light is turned on or no light is turned on.

Hereinafter, the expression "prescribed" may be replaced with "predetermined".

Figure 1:
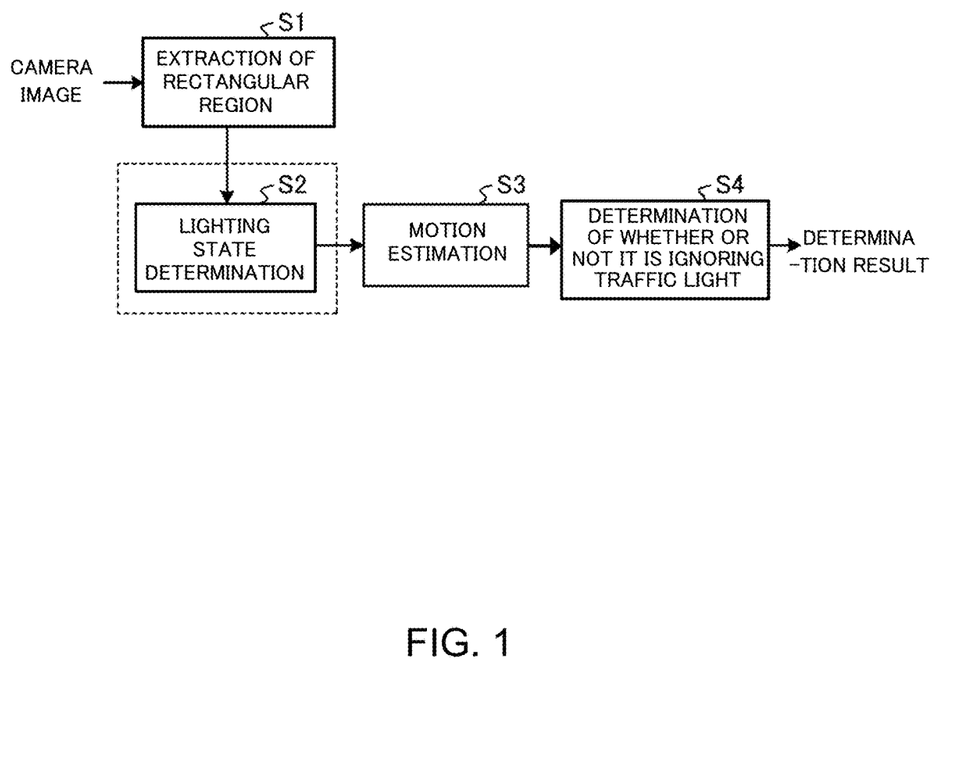
FIG. 1 is a schematic explanatory diagram (No. 1) of an image processing method according to an embodiment.
Figure 2:
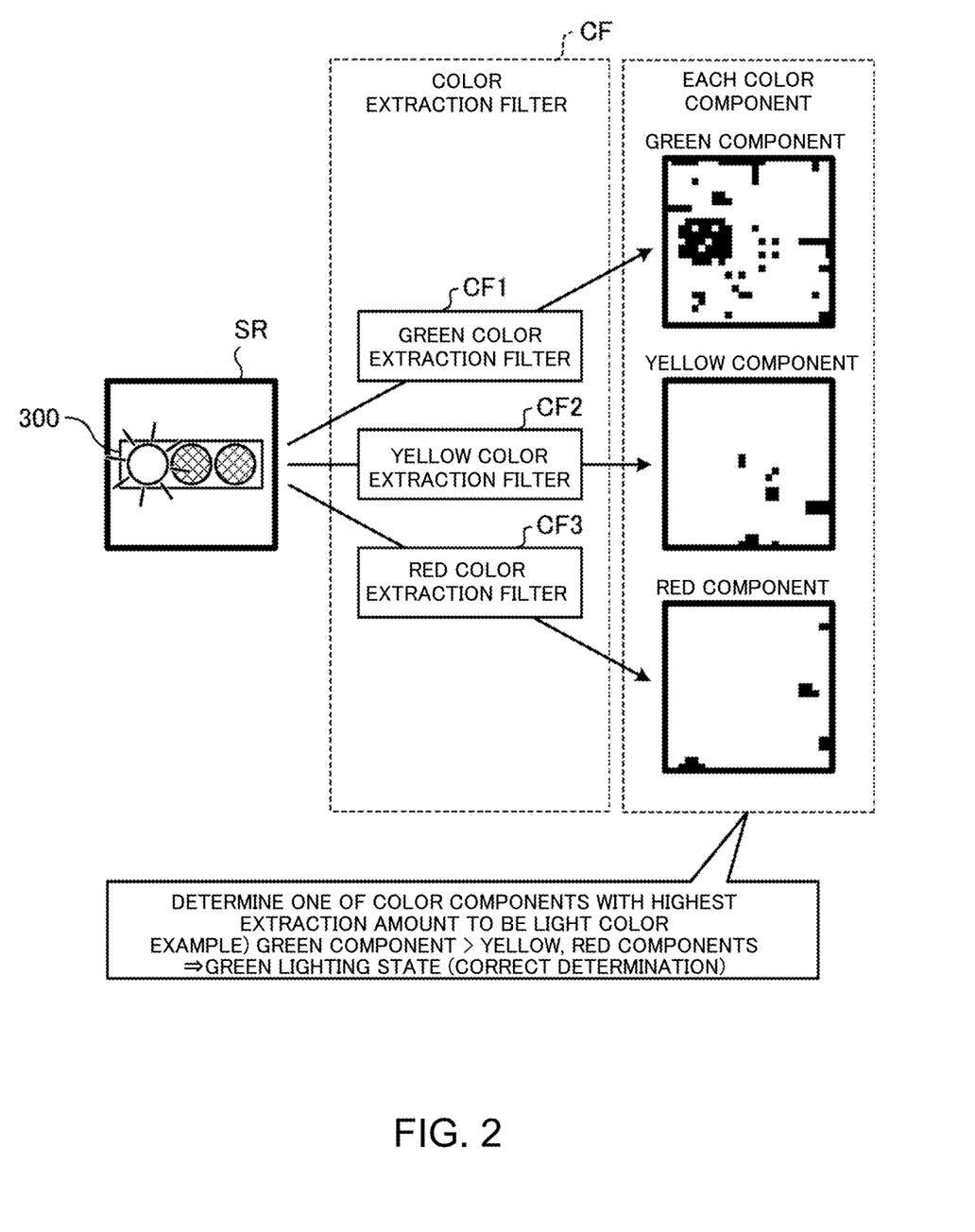
FIG. 2 is an explanatory diagram in a case where a color extraction filter is applied, and a light color is correctly determined.
Figure 3:
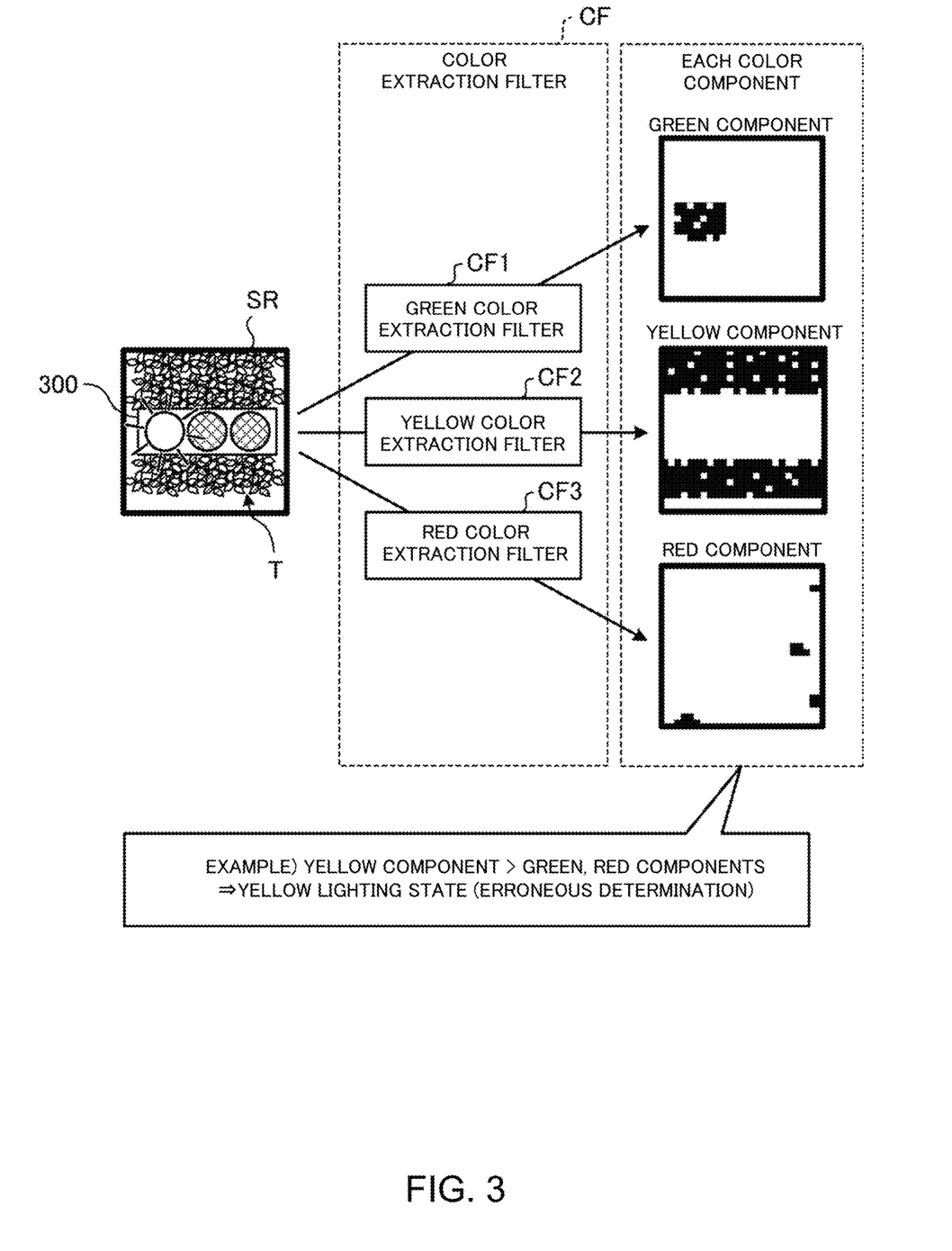
FIG. 3 is an explanatory diagram in a case where the color extraction filter is applied, and the light color is erroneously determined.
Figure 4:
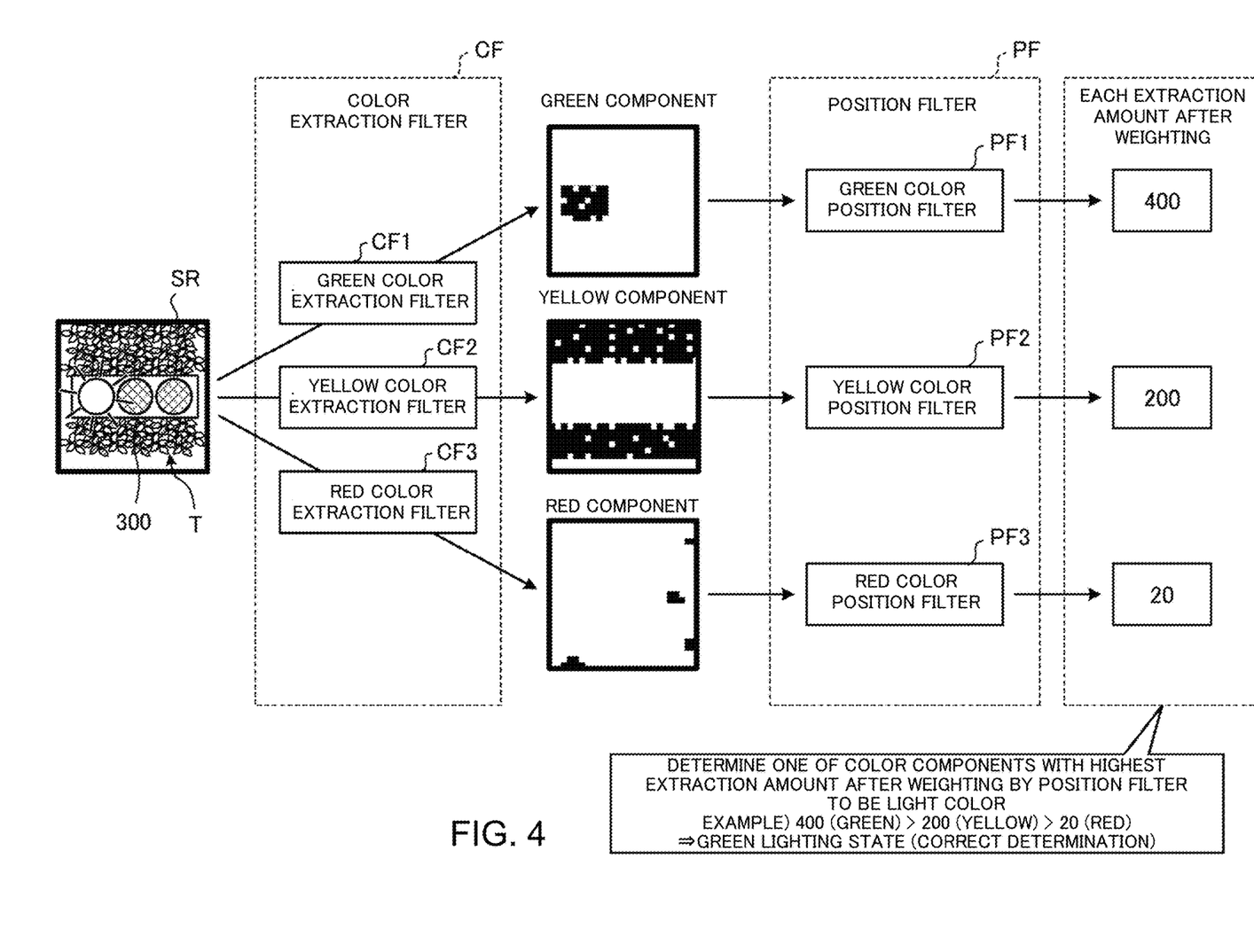
FIG. 4 is a schematic explanatory diagram (No. 2) of the image processing method according to the embodiment.

First, an outline of the image processing method according to the embodiment will be described with reference to FIG. 1 to FIG. 4. FIG. 1 is a schematic explanatory diagram (No. 1) of the image processing method according to the embodiment. FIG. 2 is an explanatory diagram in a case where a color extraction filter CF is applied, and a light color is correctly determined. FIG. 3 is an explanatory diagram in a case where the color extraction filter CF is applied, and the light color is erroneously determined. FIG. 4 is a schematic explanatory diagram (No. 2) of the image processing method according to the embodiment.

The image processing apparatus 10 detects the lighting state of the traffic light 300, and for example, determines whether or not a driver of the vehicle ignores the traffic light based on the detection result. Such information processing is executed by a controller 12 (refer to FIG. 8) included in the image processing apparatus 10.

As illustrated in FIG. 1, the controller 12 inputs the camera image and specify a rectangular region in which the traffic light 300 exists from the image. (a step S1). In the step S1, an existing image processing technology is applied. In the step S1, the controller 12 identifies the rectangular region in which the traffic light 300 exists from the image using a DNN (Deep Neural Network) model, etc., learned by using a machine learning algorithm. In the following, such a rectangular region is referred to as a "signal region SR".

Subsequently, the controller 12 inputs the signal region SR and determines the lighting state of the traffic light 300 (a step S2). In the step S2, the controller 12 analyzes an image of the signal region SR and determines whether the traffic light 300 is in the green lighting state, the yellow lighting state, or the red lighting state. Specifically, the controller 12 detects green pixels, yellow pixels and red pixels from the plurality of the pixels in the signal region SR, and determines the light color of the traffic light 300 based on a total value of the pixels. In the red lighting state, the controller 12 further determines whether or not the traffic light 300 is in an arrow lighting state.

Next, the controller 12 performs motion estimation of estimating how the traffic light 300 moves relative to a traveling vehicle by a difference between frames of the camera image (a step S3). Then, the controller 12 determines whether or not the driver of the vehicle is ignoring the traffic light based on a result of the lighting state determination in the step S2 and a result of the motion estimation in the step S3 (a step S4), and outputs the determination result.

The image processing method according to the embodiment is applied in the step S2 surrounded by a dashed rectangle. In the conventional technology, when determining the light color of the traffic light 300 in the step S2, the controller 12 detects the pixels having respective color components corresponding to the respective light colors of the traffic light 300 from the plurality of the pixels in the signal region SR using the color extraction filter CF, and determines the light color based on the total value of the pixels. The color extraction filter CF is, for example, a computer program. Examples of the color extraction filter CF include a green color extraction filter CF1, a yellow color extraction filter CF2, and a red color extraction filter CF3 corresponding to the respective light colors of the traffic light 300.

Specifically, as illustrated in FIG. 2, the controller 12 applies the green color extraction filter CF1 to the signal region SR and detects the green pixels having a green component from the plurality of the pixels in the signal region SR. Furthermore, the controller 12 applies the yellow color extraction filter CF2 to the signal region SR and detects the yellow pixels having a yellow component from the plurality of the pixels in the signal region SR. Moreover, the controller 12 applies the red color extraction filter CF3 to the signal region SR and detects the red pixels having a red component from the plurality of the pixels in the signal region SR.

Here, it is assumed that the traffic light 300 is in the green lighting state. The controller 12 compares the total value of the detected pixels having the respective color components, and as illustrated in FIG. 2, determines a color component of one of the pixels with the highest total value to be the light color. As in an example illustrated in FIG. 2, when the amount of the pixels having the green component is larger than the amount of the pixels having the yellow and red components, the controller 12 correctly determines that the traffic light 300 is in the green lighting state.

However, in the conventional technology, the color components other than the respective light colors of the traffic light 300 are not sufficiently considered. Thus, the light color of the traffic light 300 may be erroneously determined by these color components other than the respective light colors.

As illustrated in FIG. 3, in the signal region SR in which the traffic light 300 is in the green lighting state, it is assumed that there is a yellow leafy tree T in a background of the traffic light 300. In this case, when the controller 12 applies the color extraction filter CF to the signal region SR and detects the pixels having the respective color components, the amount of the detected pixels having the yellow component may become larger than the amount of the pixels having the green and red components. In this case, in the conventional technology, the controller 12 may erroneously determine that the traffic light 300 is in the yellow lighting state.

Therefore, in the image processing method according to the embodiment, when determining the light color of the traffic light 300 in the step S2, a position filter PF (refer to FIG. 4) is applied to the pixels having the respective color components corresponding to the respective light colors of the traffic light 300 that has been detected by using the color extraction filter CF. The position filter PF assigns weighting values according to the respective light colors to the pixels in respective light positions of the traffic light 300. The position filter PF is, for example, a computer program, and examples of the position filter PF include a green color position filter PF1, a yellow color position filter PF2, and a red color position filter PF3. The controller 12 determines the light color of the traffic light 300 based on the total value of the pixels having the respective color components to which the weighting values are assigned by the position filter PF.

Specifically, as illustrated in FIG. 4, in the image processing method according to the embodiment, the controller 12 applies the color extraction filter CF to the signal region SR in a conventional manner and detects the pixels having the respective color components corresponding to the respective light colors of the traffic light 300.

However, in the image processing method according to the embodiment, the controller 12 further applies the position filter PF to the detected pixels having the respective color components. That is, by mapping the detected pixels having the respective color components in the position filter PF, the controller 12 assigns the weighting values according to the respective color components to the pixels in the respective light positions of the traffic light 300. The controller 12 applies the green color position filter PF1 to the pixels having the green component. The controller 12 applies the yellow color position filter PF2 to the pixels having the yellow component. The controller 12 applies the red color position filter PF3 to the pixels having the red component.

Figure 5:
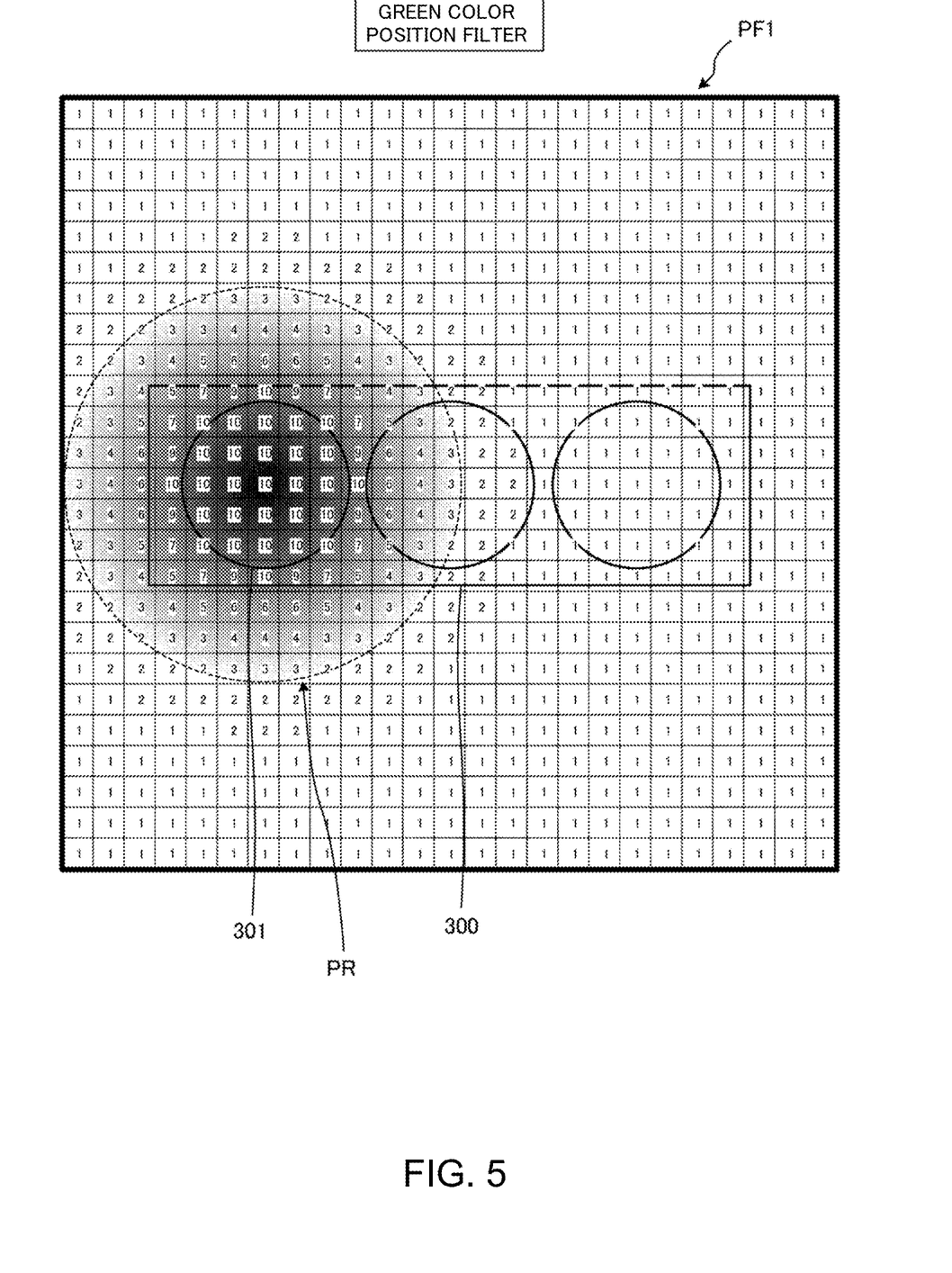
FIG. 5 illustrates a configuration example of a green color position filter.
Figure 6:
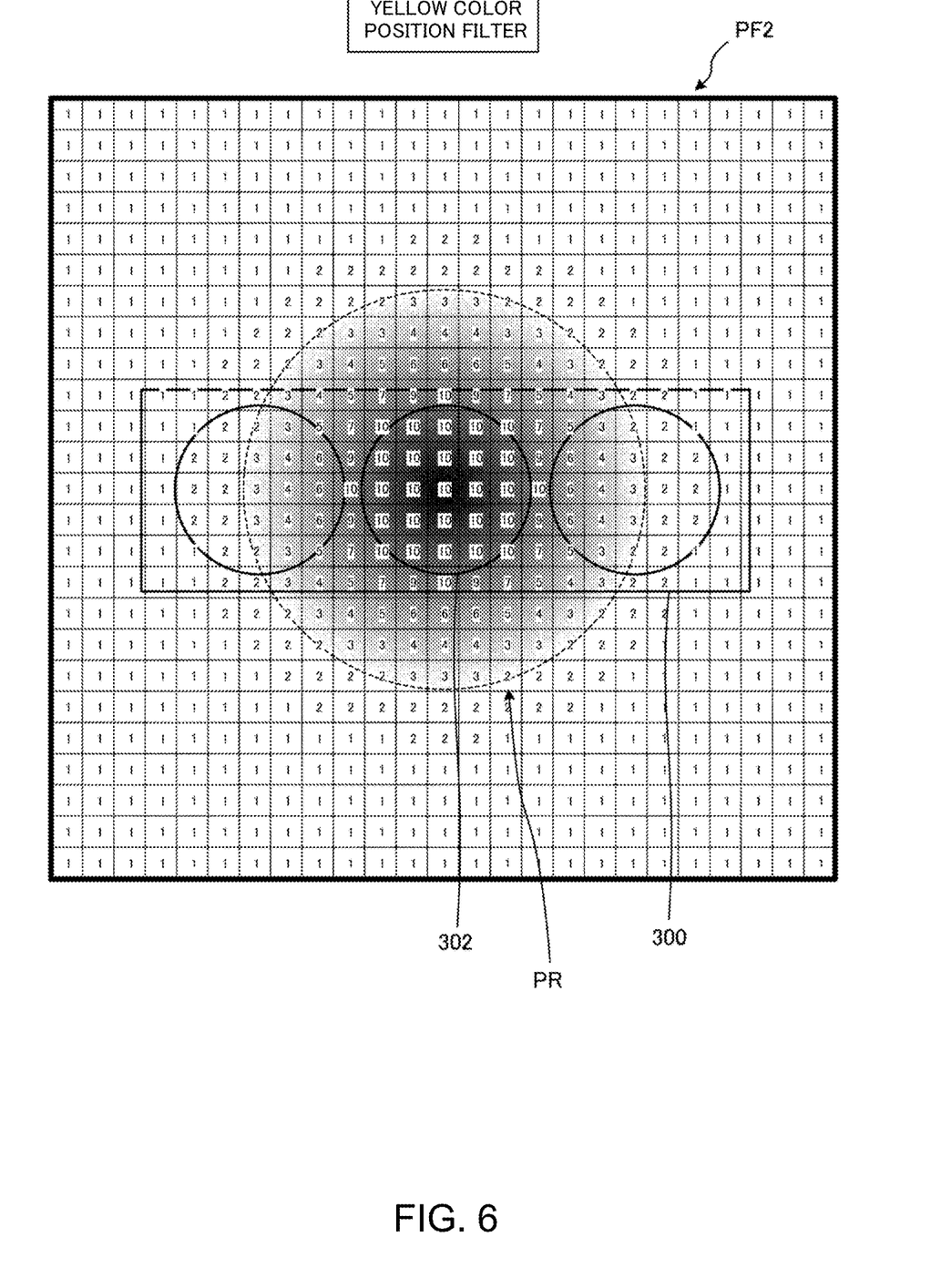
FIG. 6 illustrates a configuration example of a yellow color position filter.
Figure 7:
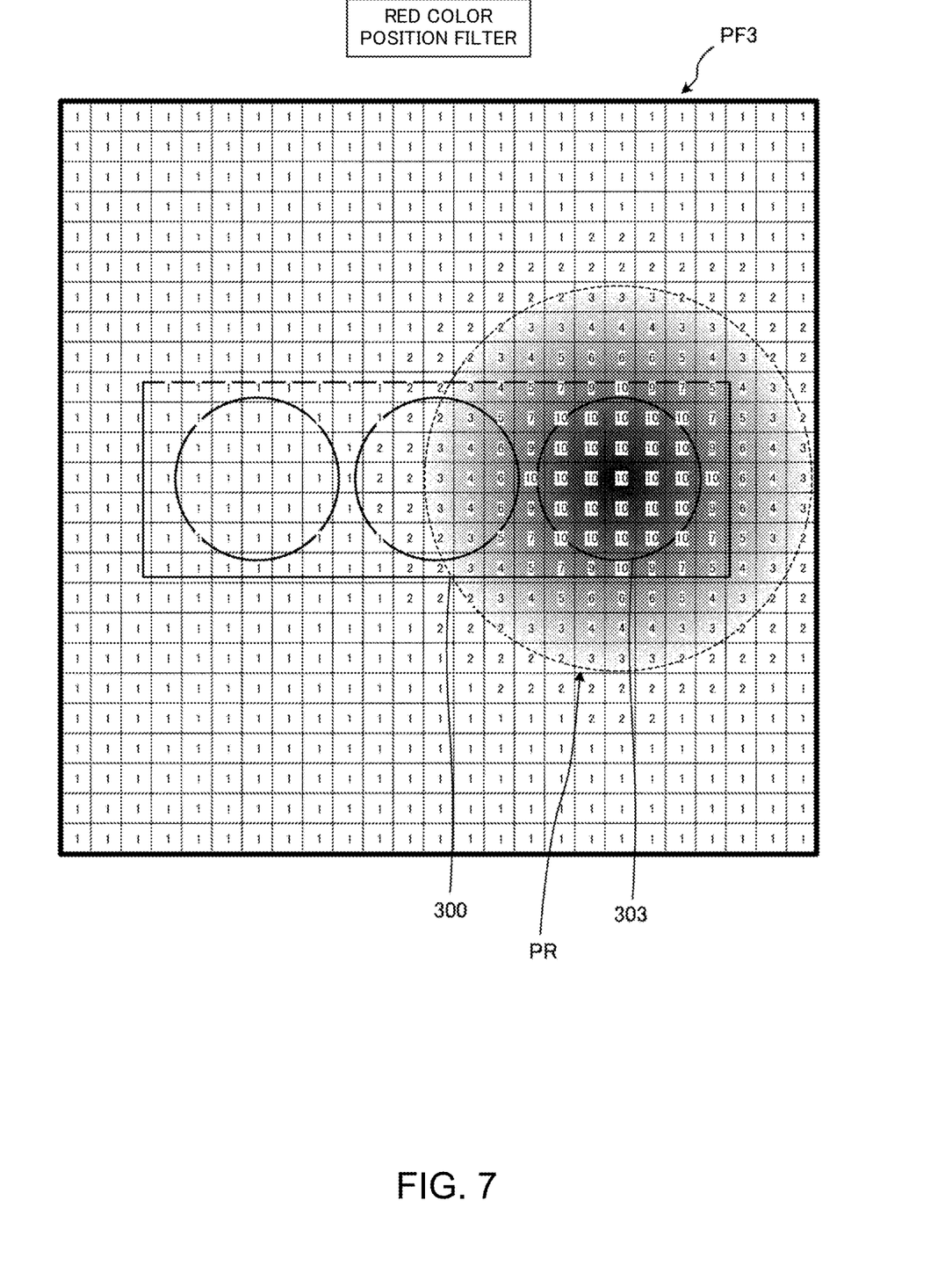
FIG. 7 illustrates a configuration example of a red color position filter.

Here, each configuration example of the green color position filter PF1, the yellow color position filter PF2, and the red color position filter PF3 will be described. FIG. 5 illustrates the configuration example of the green color position filter PF1. FIG. 6 illustrates the configuration example of the yellow color position filter PF2. FIG. 7 illustrates the configuration example of the red color position filter PF3.

Next, an application method of the position filter PF in a case where values of the pixels having the respective color components corresponding to the respective light colors that have been detected by using the color extraction filter CF are respectively set to 1, and values of the pixels having the color components not corresponding to the respective light colors are respectively set to 0 will be described. As illustrated in FIG. 5, the green color position filter PF1 assigns 10 as a weighting value to 1 as a value of the pixels having the green component in a partial region PR corresponding to a position of a green light 301 included in the traffic light 300. In the partial region PR, no weighting value is assigned to the values of the pixels not having the green component. Different values in a range of 1 to 10 may be set as the weighting values according to a density, i.e., a gradation of the green component. In this case, a weighting value of 10 is assigned to the pixels having the darkest green component, and a weighting value of 1 is assigned to the pixels having the lightest green component. As a result of applying the green color position filter PF1, the values of the pixels having the green component within the partial region PR are set to be larger than the values of the pixels having the green component outside the partial region PR. In the position of the green light 301, when the green light is turned on, green color naturally becomes darker than that in other positions. Therefore, since the weighting values of the pixels having the green component in the partial region PR are set to be larger than the values of the pixels having the green component outside the partial region PR, the green component due to the green light 301 is separated from the green component of the background, etc.

For a configuration common to the position filter PF (not only the green color position filter PF1 but also other position filters), the position filter PF is set to have the same shape and size as the signal region SR. When the controller 12 extracts the signal region SR from the camera image, the controller 12 samples images of the traffic light 300 having various sizes that are reflected in the camera image so that the images always have the same shape and size (e.g., 25×25 pixels), and extracts the images as the signal region SR.

Thus, the controller 12 sets the position filter PF to be, for example, a filter with 25×25 pixels according to the signal region SR. According to the example described here, each of the position filters PF1 to PF3 illustrated in FIG. 5 to FIG. 7 is expressed by 25×25 pixels. A numerical value set in a position corresponding to each pixel is a weighting coefficient for each pixel that is detected as each of the color components from the signal region SR. A minimum value of the weighting coefficient is, for example, 1. A maximum value of the weighting coefficient is, for example, 10. The minimum value of the weighting coefficient may be 0, and the maximum value of the weighting coefficient may be a value larger than 10.

For example, after a value of each of the pixels that has been detected as having each of the color components by the color extraction filter CF is respectively set to 1, the controller 12 multiplies each value by the weighting coefficient (weighting value) on the position filter PF corresponding to each of the detected pixels. Then, a sum of the values obtained by multiplying for each of the color components is the total value after performing weighting for each of the color components.

For the green color position filter PF1, the controller 12 sets the partial region PR to have a circular shape with a central part of the green light 301 as a center. This is because a shape of the green light 301 is a circle. Therefore, if the shape of the green light 301 is not a circle, the controller 12 sets the partial region PR with a central part of a non-circular shape as a center. In this way, by setting the partial region PR according to the shape of the green light 301, it is possible to weight the green component when the green light is turned on according to the shape of the green light 301.

It is preferable that the partial region PR is set to have a circular shape larger than an outer shape of the green light 301 in consideration of light emission characteristics of light radially spreading. Thus, when the green light is tuned on, it is possible to weight the green component of a part outside the outer shape of the green light 301.

When the controller 12 sets the partial region PR to have a circular shape, the controller 12 sets the green color position filter PF1 so that the closer the green component is to the center of this circular shape, the more the green component is weighted. In a case where the green light 301 has a circular shape, when the green light is turned on, the closer the green component is to the center of this circular shape, the darker the green color becomes (refer to the gradation in the figure). Thus, it is possible to weight the green component in a state close to the actual state of the green light 301 when the green light is turned on.

As illustrated in FIG. 6, the yellow color position filter PF2 is set so that a weighting value of the yellow component in the partial region PR corresponding to a position of a yellow light 302 included in the traffic light 300 becomes larger than a weighting of the yellow component outside the partial region PR. Other configurations of the yellow color position filter PF2 are similar to those of the green color position filter PF1 with the only difference between the green color and yellow color. Thus, a description of other configurations will be omitted.

As illustrated in FIG. 7, the red color position filter PF3 is set so that a weighting value of the red component in the partial region PR corresponding to a position of a red light 303 included in the traffic light 300 becomes larger than a weighting value of the red component outside the partial region PR. Other configurations of the red color position filter PF3 are similar to those of the green color position filter PF1 and the yellow color position filter PF2 with the only differences between the green color and red color and between the yellow color and the red color. Thus, a description of other configurations will be omitted.

Returning to the description of FIG. 4, as illustrated in FIG. 4, the controller 12 determines one of the color components with the highest total value after assigning the weighting values by the position filter PF to be the light color. In an example of FIG. 4, since a relationship of the total values after performing the weighting is expressed by "400 (green)>200 (yellow)>20 (red)", the controller 12 correctly determines that the traffic light 300 is in the green lighting state. That is, the controller 12 suppresses erroneous determination regarding the signal region SR in which there is the leafy tree T in the background, and the light color has been erroneously determined in an example of FIG. 3.

In the following, a configuration example of the image processing apparatus 10 to which the image processing method according to the embodiment is applied will be more specifically described.

Figure 8:
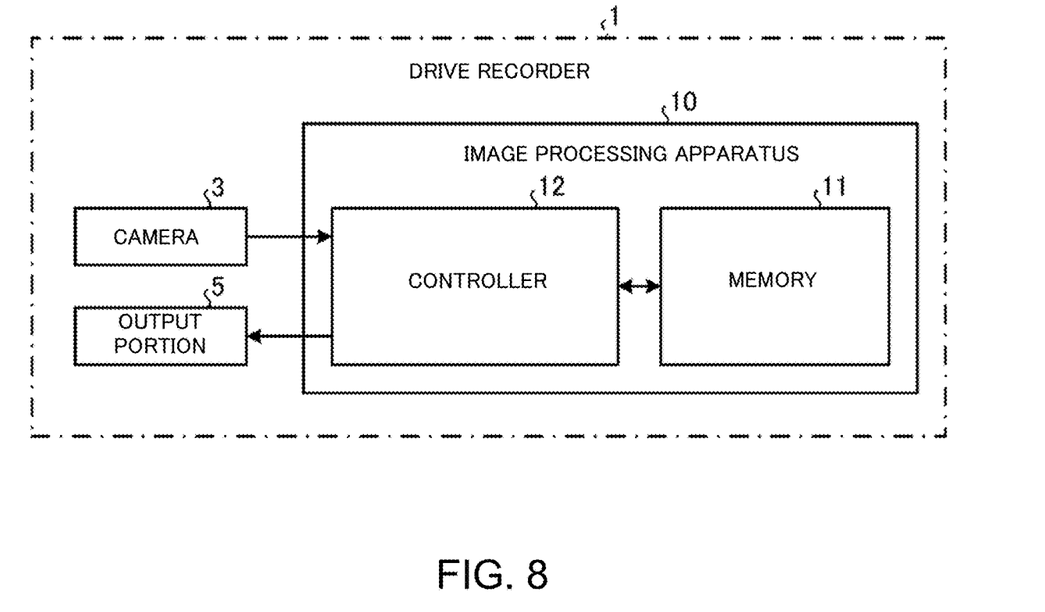
FIG. 8 illustrates a configuration example of an image processing apparatus according to the embodiment.

FIG. 8 illustrates the configuration example of the image processing apparatus 10 according to the embodiment. As illustrated in FIG. 8, the image processing apparatus 10 includes a memory 11 and the controller 12. A camera 3 and an output portion 5 are connected to the image processing apparatus 10.

The camera 3 is mounted in the vehicle and provided to capture an image in front of the vehicle. The camera 3 may be a 360-degree camera capable of capturing images not only in front of the vehicle but also all around the vehicle.

The output portion 5 is an output device that presents output information from the image processing apparatus 10. The output portion 5 is implemented by a display, a speaker, and the like.

The image processing apparatus 10 is, for example, a computer to be mounted in the vehicle. The image processing apparatus 10 performs at least an information processing of the steps S1 to S4 described with reference to FIG. 1.

The memory 11 is implemented by a storage device, such as a RAM (Random Access Memory) or a flash memory. The memory 11 stores a computer program according to the embodiment executed by the controller 12. Furthermore, the memory 11 stores various information that is used in the information processing executed by the controller 12.

The memory 11 stores, for example, an AI (Artificial Intelligence) model for the image recognition. The memory 11 stores setting information of the color extraction filter CF and the position filter PF.

The controller 12 corresponds to a processor. The controller 12 is implemented by a CPU (Central Processing Unit), an MPU (Micro Processing Unit), a GPU (Graphics Processing Unit), or the like. The controller 12 reads and executes a computer program according to the embodiment stored in the memory 11 using the RAM as a work area. The controller 12 is also implemented by an integrated circuit, such as an ASIC (Application Specific Integrated Circuit) or a FPGA (Field Programmable Gate Array).

Figure 10:
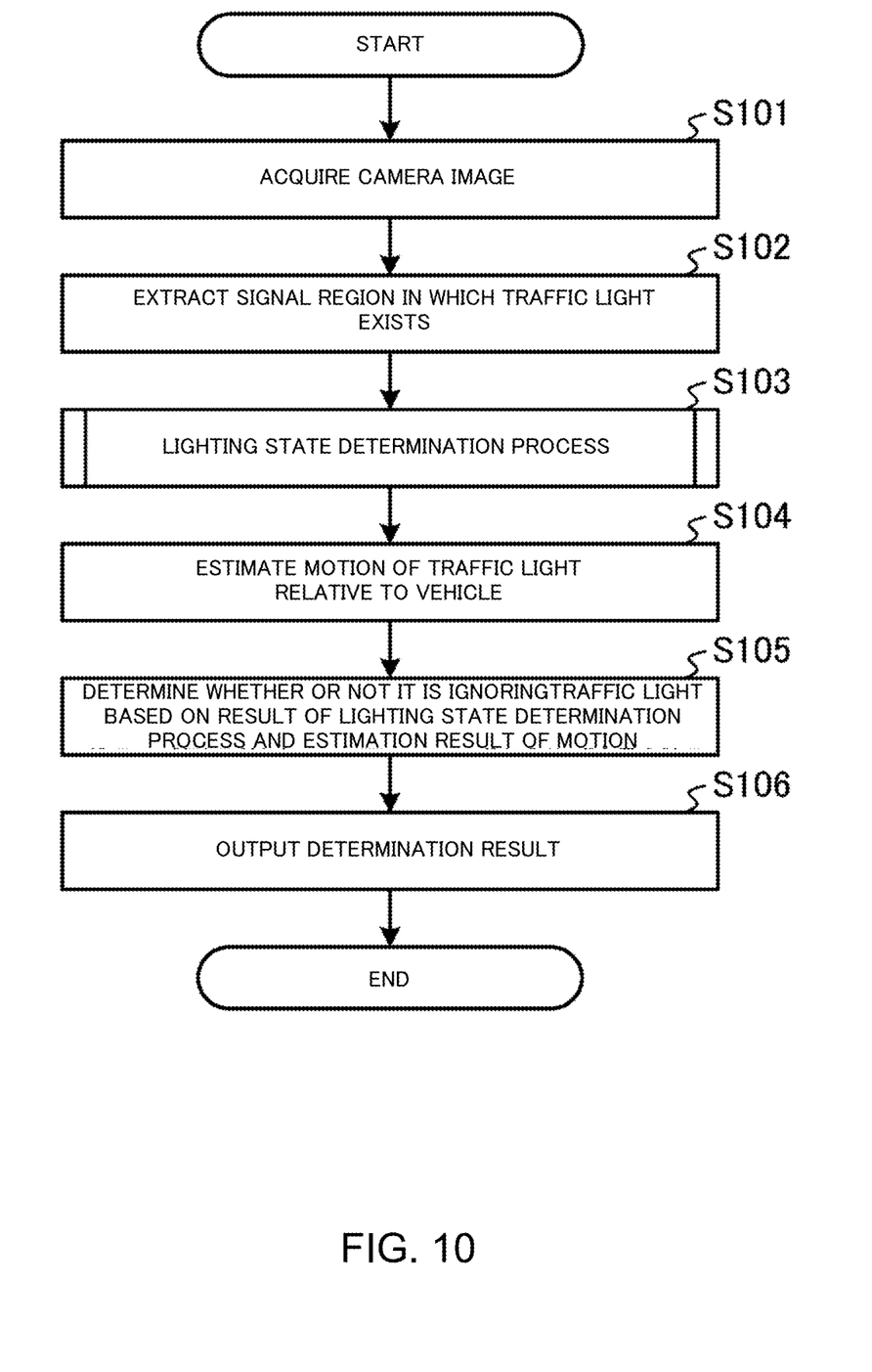
FIG. 10 is a flowchart (No. 1) illustrating a processing procedure executed by the image processing apparatus according to the embodiment.
Figure 11:
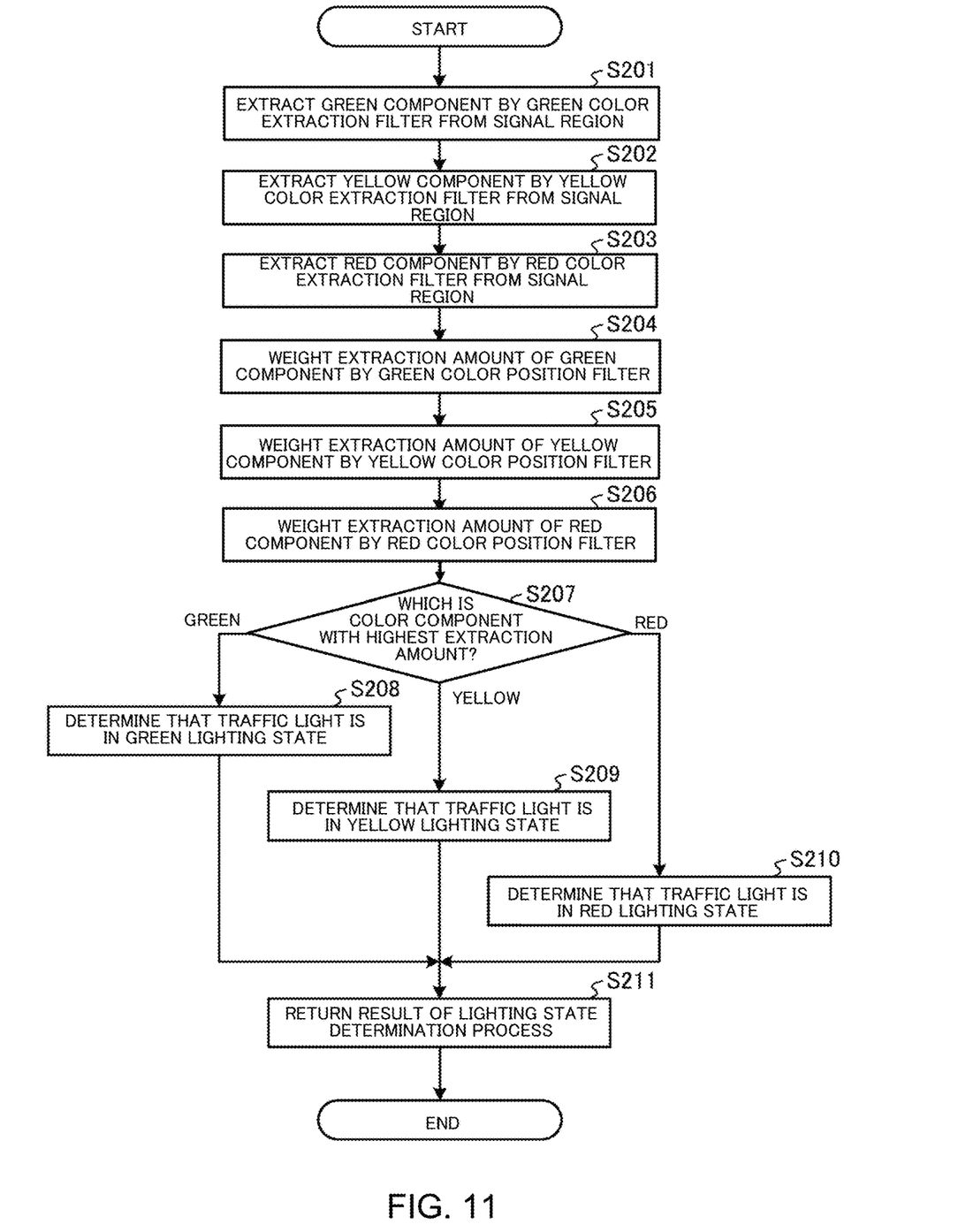
FIG. 11 is a flowchart (No. 2) illustrating a processing procedure executed by the image processing apparatus according to the embodiment.

The controller 12 performs the information processing according to the processing procedure illustrated in each flowchart of FIG. 10 and FIG. 11. An explanation with reference to FIG. 10 and FIG. 11 will be described later.

As illustrated in FIG. 8, the camera 3, the output portion 5 and the image processing apparatus 10 are implemented as a drive recorder 1. In this case, the camera 3 is implemented by a camera unit to be mounted in the drive recorder 1. The output portion 5 is implemented by a display and a speaker to be mounted in the drive recorder 1. The image processing apparatus 10 is implemented by a microcomputer to be mounted in the drive recorder 1.

Figure 9:
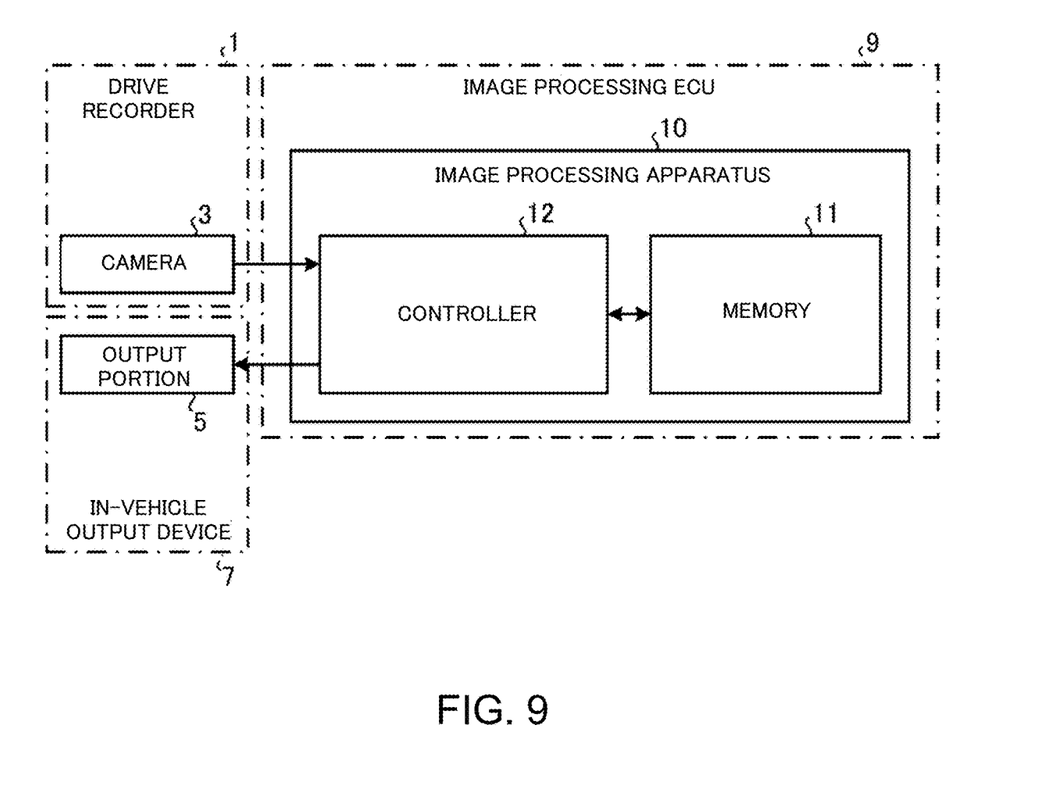
FIG. 9 illustrates a configuration example of an image processing apparatus according to a modification example.

The configuration example illustrated in FIG. 8 is one example, and besides this, modification examples will be given. FIG. 9 illustrates a configuration example of an image processing apparatus 10 according to a modification example. As illustrated in FIG. 9, the image processing apparatus 10 is implemented as an image processing ECU (Electronic Control Unit) 9. In this case, a camera 3 is, for example, implemented by a camera unit to be mounted in a drive recorder 1. The camera 3 may be implemented by an in-vehicle camera unit other than the drive recorder 1. An output portion 5 is implemented by an in-vehicle display and an in-vehicle speaker as an in-vehicle output device 7 to be mounted in a vehicle.

In an example of FIG. 9, the camera 3 and the output portion 5 are connected to the image processing apparatus 10 via an in-vehicle network, such as a CAN (Controller Area Network). The camera 3 and the output portion 5 may be connected to the image processing apparatus 10 via a Bluetooth (registered trademark), a Wi-Fi (registered trademark), a UWB (Ultra Wide Band), or the like, by using a wireless network.

Next, a processing procedure of the information processing executed by the controller 12 of the image processing apparatus 10 will be described with reference to FIG. 10 and FIG. 11. FIG. 10 is a flowchart (No. 1) illustrating the processing procedure executed by the image processing apparatus 10 according to the embodiment. FIG. 11 is a flowchart (No. 2) illustrating the processing procedure executed by the image processing apparatus 10 according to the embodiment.

In order to determine whether or not the driver of the vehicle is ignoring the traffic light as illustrated in FIG. 1, the controller 12 acquires a camera image from the camera 3 as illustrated in FIG. 10 (a step S101). Subsequently, the controller 12 specifies the signal region SR in which the traffic light 300 exists from the acquired camera image (a step S102).

Subsequently, the controller 12 performs a "lighting state determination process" to determine the lighting state of the traffic light 300 based on the extracted signal region SR (a step S103).

In this "lighting state determination process", as illustrated in FIG. 11, the controller 12 applies the green color extraction filter CF1 to the extracted signal region SR and detects the pixels having the green component by the green color extraction filter CF1 from the signal region SR (a step S201).

The controller 12 applies the yellow color extraction filter CF2 to the signal region SR and detects the pixels having the yellow component by the yellow color extraction filter CF2 from the signal region SR (a step S202).

The controller 12 applies the red color extraction filter CF3 to the signal region SR and detects the pixels having the red component by the red color extraction filter CF3 from the signal region SR (a step S203). The order of the steps S201 to S203 may be arbitrary. The steps S201 to S203 may be performed in parallel.

Subsequently, the controller 12 weights the total value of the green component that has been detected in the step S201 by the green color position filter PF1 (a step S204). The controller 12 weights the total value of the yellow component that has been detected in the step S202 by the yellow color position filter PF2 (a step S205).

The controller 12 weights the total value of the red component that has been detected in the step S203 by the red color position filter PF3 (a step S206). The order of the steps S204 to S206 may be arbitrary. The steps S204 to S206 may be performed in parallel.

Then, the controller 12 determines one of the color components with the highest total value after performing the weighting by the position filter PF (a step S207). Here, when it is the green component (green in the step S207), the controller 12 determines that the traffic light 300 is in the green lighting state (a step S208).

When it is the yellow component (yellow in the step S207), the controller 12 determines that the traffic light 300 is in the yellow lighting state (a step S209). When it is the red component (red in the step S207), the controller 12 determines that the traffic light 300 is in the red lighting state (a step S210).

Subsequently, the controller 12 returns a result of the lighting state determination process (a step S211). Then, the controller 12 ends the lighting state determination process.

Returning to the description of FIG. 10, when the controller 12 ends the step S103, the controller 12 estimates a motion of the traffic light 300 relative to the vehicle (a step S104). The controller 12, as described above, for example, estimates how the traffic light 300 moves relative to the traveling vehicle by the difference between the frames of the camera image.

Subsequently, the controller 12 determines whether or not the driver of the vehicle is ignoring the traffic light based on the result of the lighting state determination process in the step S103 and the result of the motion estimation in the step S104 (a step S105). Then, the controller 12 outputs the determination result to the output portion 5 (a step S106) and the ends the process.

Although illustration is omitted, the controller 12 may output the determination result to the output portion 5 based on stability of the determination result between the frames of the camera image. In one example, when the stability is considered to be high, such as having continuously the same determination result between the frames, the controller 12 may output the determination result to the output portion 5. As a result, it is possible to output the stable determination result that is hardly affected by a disturbance, and the like.

By the way, in the description of the position filter PF described above, an example in which the partial region PR is set to have a circular shape with the central part of each of the lights 301 to 303 as the center has been described. However, the partial region PR may have not only a true circular shape but also an elliptical shape.

Figure 12:
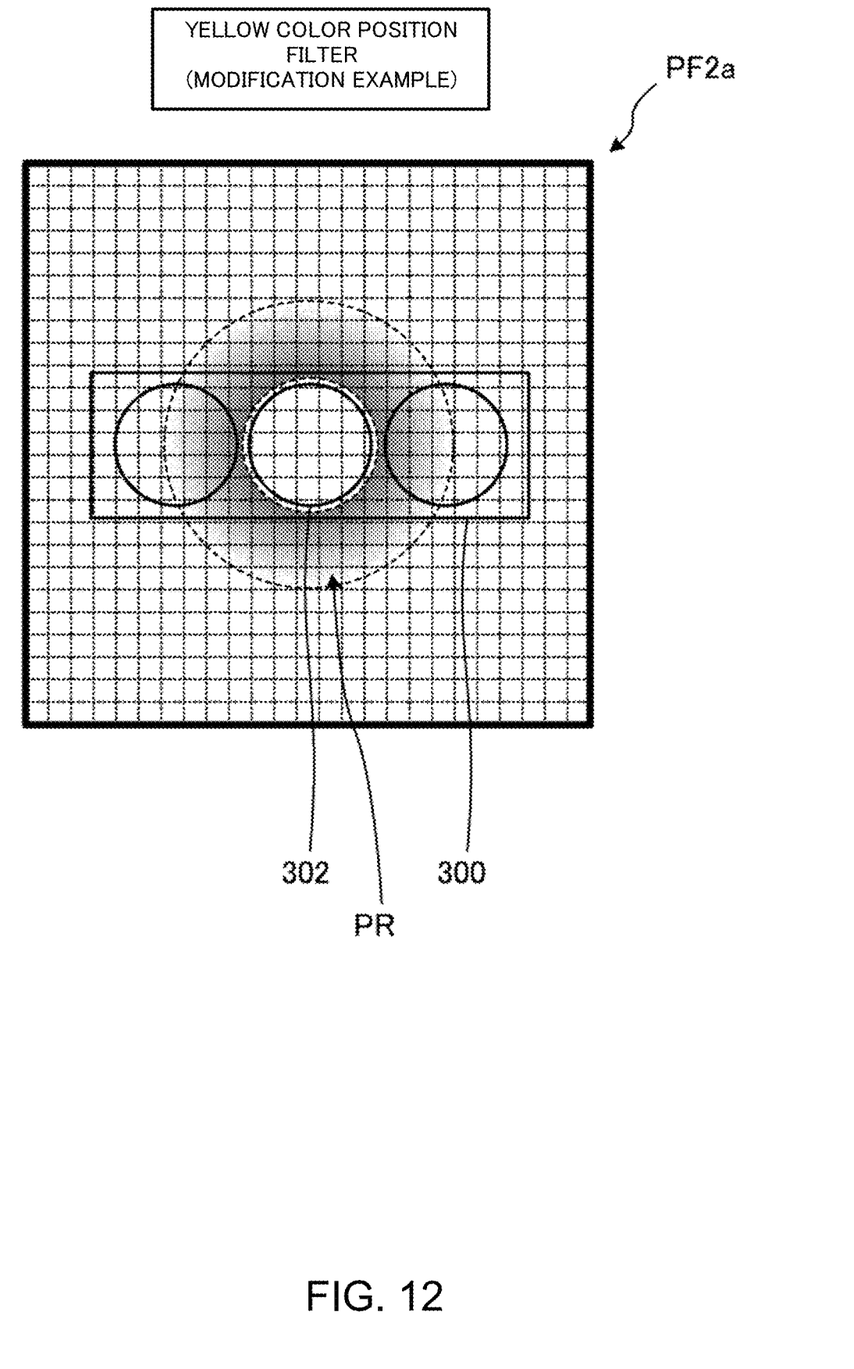
FIG. 12 illustrates a configuration example of a position filter according to the modification example.

Alternatively, the partial region PR may be set to have an annular shape with the central part of each of the lighting devices 301 to 303 as the center. Such a modification example will be described using a yellow color position filter PF2a as an example. FIG. 12 illustrates a configuration example of the yellow color position filter PF2 according to the modification example.

As illustrated in FIG. 12, the partial region PR may be set to have an annular shape with the central part of the yellow light 302 as the center. At this time, it is preferable that the partial region PR be set so that a weight of the color component in the partial region PR surrounded by inner and outer edges of the annular shape becomes larger than a weight of the color component outside the partial region PR. As a result, when the central part of the yellow light 302 is overexposed and reflected in the camera image due to halation at night, the controller 12 suppresses deterioration of the determination accuracy of the light color. Similarly, the partial region PR may be set to have an annular shape for the green light 301 and the red light 303.

Different position filters PF in which the partial regions PR having circular and annular shapes are respectively set may be prepared in advance, and the controller 12 may appropriately switch between the position filters PF, for example, depending on the time of day. In this case, the controller 12 may switch to the position filter PF in which the partial region PR having an annular shape is set at night during which halation is more likely to occur due to contrast, and may switch to the position filter PF in which the partial region PR having a circular shape is set during the day. When the controller 12 detects a situation in which the contrast is likely to occur based on an illuminance, the controller 12 may switch to the position filter PF in which the partial region PR having an annular shape is set.

The position filters PF in which an inner diameter of the partial region PR having an annular shape is larger or smaller than an outer diameter of the lighting device may be prepared in advance. The controller 12 may appropriately switch to the position filter PF that provides more stability depending on the stability described above.

As described above, the image processing apparatus 10 according to the embodiment has the controller 12. The controller 12 extracts the signal region SR in which the traffic light 300 exists by the image recognition of the camera image. The controller 12 detects the respective color components corresponding to the respective light colors of the traffic light 300 from the signal region SR. The controller 12 applies the position filter PF (corresponding to one example of the "filter") that weights the respective color components according to the respective light positions of the traffic light 300. Furthermore, the controller 12 determines the light color of the traffic light 300 based on the respective color components that have been weighted. As a result, since one color component of one light position is emphasized, the light color of the traffic light 300 is determined even when there is a small amount of the color component. Moreover, since the color components of positions other than the one light position are suppressed, the light color of the traffic light 300 is prevented from being erroneously detected by the color components other than the light colors of the traffic light 300 due to the background of the traffic light 300, and the like. That is, according to the image processing apparatus 10 according to the embodiment, even when an object having a color other than the light color that actually emits light as the background of the traffic light is reflected in the camera image, by assigning a higher weighting value to the number of the green, yellow and red pixels in the positions respectively corresponding to locations of the green, yellow and red lights, the number of the color pixels to be detected by the object having the color other than the light color is relatively reduced. Thus, it is possible to improve a discrimination accuracy of the light color of the traffic light.

In the embodiment described above, although the lighting state and motion of the traffic light 300 and whether the driver of the vehicle is ignoring the traffic light are determined based on the image recognition, sensor data of various sensors mounted in the vehicle may be naturally combined as appropriate. For example, a behavior of the vehicle may be estimated using sensor values of a steering sensor and an acceleration sensor. A vehicle speed of an own vehicle may be acquired by using a sensor value of a speed sensor.

In the embodiment described above, although the signal region SR is the rectangular region, the signal region SR is not limited to the rectangular region.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus that identifies a lighting state of a traffic light having a green light, a yellow light, and a red light, the image processing apparatus comprising a controller configured to:
   (i) specify a traffic light region in an image acquired from an in-vehicle camera;
   (ii) detect green pixels, yellow pixels, and red pixels in the traffic light region;
   (iii) perform weighting by assigning a higher weighting value to the green pixels, the yellow pixels and the red pixels in positions respectively corresponding to locations of the green light, the yellow light, and the red light in the traffic light region; and
   (iv) determine the lighting state of the traffic light as either green, yellow or red based on a comparison of a total number of pixels for each of the green, yellow and red pixels after performing the weighting.

2. The image processing apparatus according to claim 1, wherein
the weighting includes applying green, yellow and red filters in which a partial region of the traffic region is set to have a circular shape with a central part of each of the green, yellow and red lights as a center of the respective green, yellow and red filters.

3. The image processing apparatus according to claim 2, wherein
the closer a weighting value is to the center of the partial region, the larger the weighting value is.

4. The image processing apparatus according to claim 1, wherein
the weighting includes applying green, yellow and red filters in which a partial region of the traffic light region is set to have an annular shape with a central part of each of the green, yellow and red lights as a center of the respective green, yellow and red filters.

5. The image processing apparatus according to claim 1, wherein
the weighting includes applying green, yellow and red filters in which a partial region of the traffic light region is set to have a circular shape or an annular shape depending on a time of day, with a central part of each of the green, yellow, and red lights as a center of the respective green, yellow and red filters.

6. The image processing apparatus according to claim 1, wherein
a motion of the traffic light relative to a vehicle in which the image processing apparatus is provided is estimated from a difference between frames of the image, and whether or not a driver of the vehicle is ignoring the traffic light is determined based on the lighting state of the traffic light that is determined and the estimated motion of the traffic light.

7. An image processing method that identifies a lighting state of a traffic light having a green light, a yellow light, and a red light, the image processing method executed by an image processing apparatus, the method comprising the steps of:
(a) specifying a traffic light region in an image acquired from an in-vehicle camera;
(b) detecting green pixels, yellow pixels, and red pixels in the traffic light region;
(c) performing weighting by assigning a higher weighting value to the green pixels, the yellow pixels and the red pixels in positions respectively corresponding to locations of the green light, the yellow light, and the red light in the traffic light region; and
(d) determining the lighting state of the traffic light as either green, yellow or red based on a comparison of a total number of pixels for each of the green, yellow and red pixels after performing the weighting.

8. The image processing method according to claim 7, wherein
the weighting includes applying green, yellow and red filters in which a partial region of the traffic light region is set to have a circular shape with a central part of each of the green, yellow, and red lights as a center of the respective green, yellow and red filters.

9. The image processing method according to claim 8, wherein
the method includes increasing a weighting value as the weighting value is closer to the center of the partial region.

10. The image processing method according to claim 7, wherein
the weighting includes applying green, yellow and red filters in which a partial region of the traffic light region is set to have an annular shape with a central part of each of the green, yellow, and red lights as a center of the respective green, yellow and red filters.

11. The image processing method according to claim 7, wherein
the weighting includes applying green, yellow and red filters in which a partial region of the traffic light region is set to have a circular shape or an annular shape depending on a time of day, with a central part of each of the green, yellow, and red lights as a center of the respective green, yellow and red filters.

12. The image processing method according to claim 7, wherein
the method includes estimating a motion of the traffic light relative to a vehicle in which the image processing apparatus is provided from a difference between frames of the image, and determining whether or not a driver of the vehicle is ignoring the traffic light based on the lighting state of the traffic light that is determined and the estimated motion of the traffic light.

13. A non-transitory computer-readable recording medium having stored therein a program that causes a computer of an image processing apparatus to execute a process that identifies a lighting state of a traffic light having a green light, a yellow light, and a red light, the process comprising:
(i) specifying a traffic light region in an image acquired from an in-vehicle camera;
(ii) detecting green pixels, yellow pixels, and red pixels in the traffic light region;
(iii) performing weighting by assigning a higher weighting value to the green pixels, the yellow pixels and the red pixels in positions respectively corresponding to locations of the green light, the yellow light, and the red light in the traffic light region; and
(iv) determining the lighting state of the traffic light as either green, yellow or red based on a comparison of a total number of pixels for each of the green, yellow and red pixels after performing the weighting.

14. The non-transitory computer-readable recording medium according to claim 13, wherein:
the weighting includes applying green, yellow and red filters in which a partial region of the traffic light region is set to have a circular shape with a central part of each of the green, yellow, and red lights as a center of the respective green, yellow and red filters.

15. The non-transitory computer-readable recording medium according to claim 14, the process further comprising:
increasing a weighting value as the weighting value is closer to the center of the partial region.

16. The non-transitory computer-readable recording medium according to claim 13, wherein
the weighting includes applying green, yellow and red filters in which a partial region of the traffic light region is set to have an annular shape with a central part of each of the green, yellow, and red lights as a center of the respective green, yellow and red filters.

17. The non-transitory computer-readable recording medium according to claim 13, wherein
the weighting includes applying green, yellow and red filters in which a partial region of the traffic light region is set to have a circular shape or an annular shape depending on a time of day, with a central part of each of the green, yellow, and red lights as a center of the respective green, yellow and red filters.

18. The non-transitory computer-readable recording medium according to claim 13, the process further comprising:

estimating a motion of the traffic light relative to a vehicle in which the image processing apparatus is provided from a difference between frames of the image, and determining whether or not a driver of the vehicle is ignoring the traffic light based on the lighting state of the traffic light that is determined and the estimated motion of the traffic light.

\* \* \* \* \*